Nov. 5, 1935.  H. R. RICARDO  2,019,831
GREENHOUSE STRUCTURE
Filed June 4, 1935  2 Sheets-Sheet 2
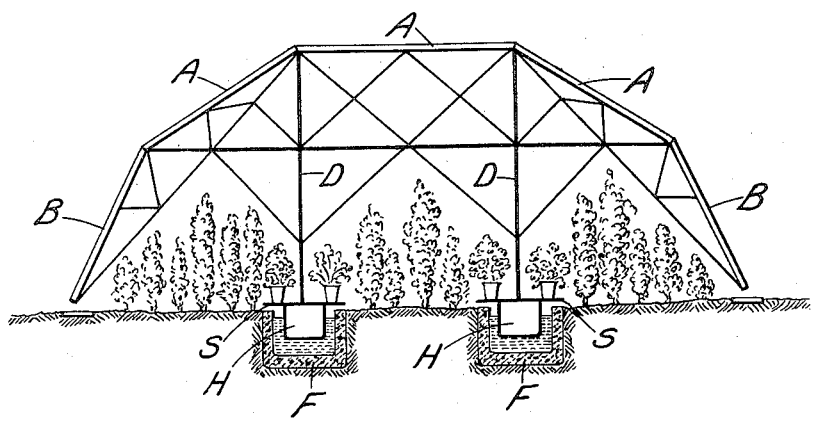
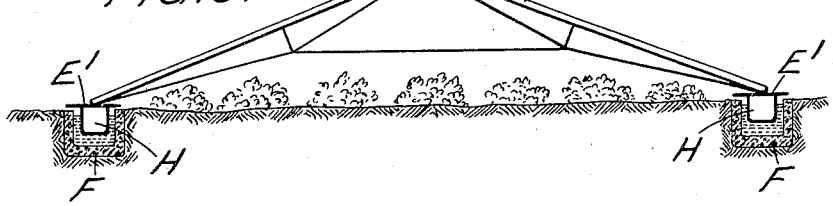
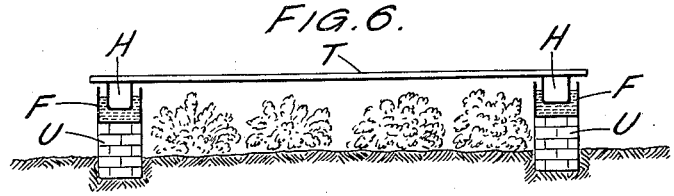
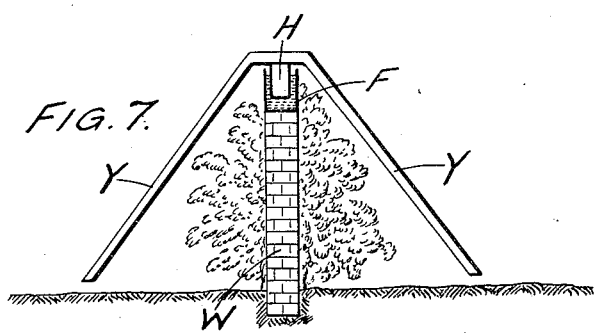
Inventor,
H. R. RICARDO.

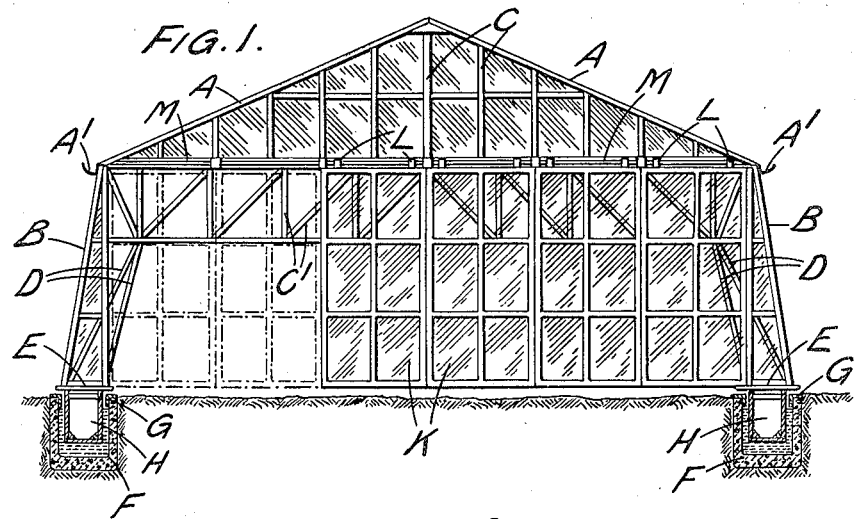
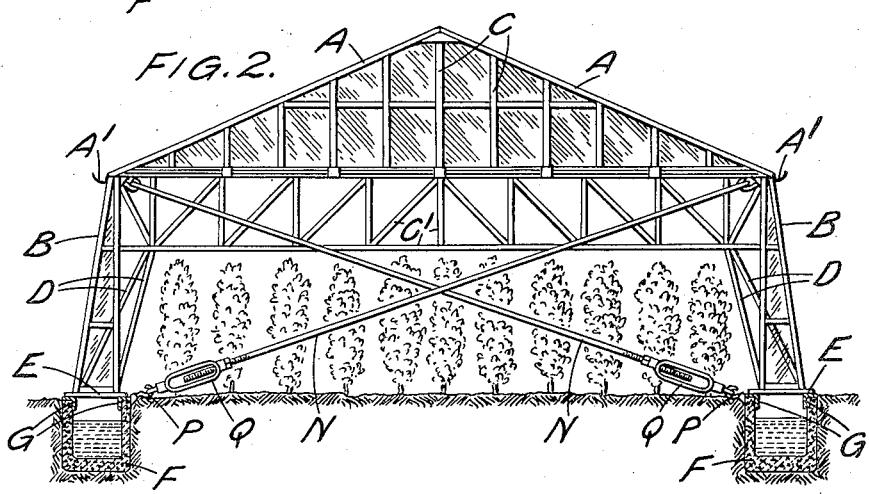
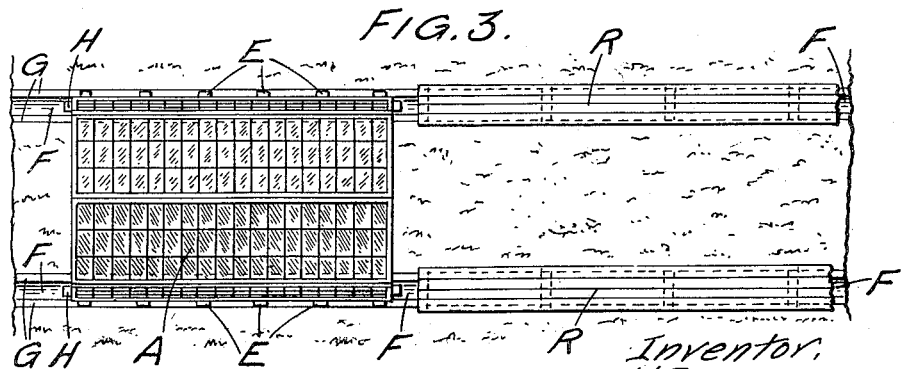

Patented Nov. 5, 1935

2,019,831

UNITED STATES PATENT OFFICE 2,019,831

GREENHOUSE STRUCTURE

Harry Ralph Ricardo, Small Dole, near Henfield, England

Application June 4, 1935, Serial No. 24,912
In Great Britain June 19, 1934

11 Claims. (Cl. 47—17)

This invention relates to a greenhouse structure of the type which is open at the bottom and capable of movement from one piece of ground to another.

In growing certain plants it is desirable at one stage of the growth that the plant should be under glass whilst at other stages this is unnecessary or even undesirable. Where such plants are planted in rotation so as to provide a more or less continuous supply of fruit or flowers, it will be appreciated that the necessary treatment under glass may be provided by means of a movable greenhouse which is moved along a strip of ground of which successive lengths have been planted at intervals.

It is an object of the present invention to provide an improved form of such movable greenhouse structure.

A greenhouse structure according to the present invention comprises a movable cover for plants and means whereby such cover can be supported on one or more floats immersed in liquid so that while borne by the liquid it can be moved. The cover may for example comprise a roof and side walls with or without means for closing the ends while leaving the bottom open.

Conveniently the structure comprises a cover carried by supports and floats adapted to be immersed in water and to fit under or to be secured to the supports and carry the structure so as to permit it to be moved horizontally.

The complete structure may comprise two horizontal parallel troughs on either side of a strip of ground, a movable cover for the plants, and supports for the cover adapted to be raised and temporarily carried by floats immersed in water in the troughs so that the cover can be moved along the strip of ground.

It will be appreciated that the invention provides a convenient and efficient arrangement for moving the greenhouse. In the first place if the buoyancy of floats is relied upon to raise the greenhouse preparatory to its movement the greenhouse will be evenly supported throughout its length so that there will be little tendency to distortion which might cause breakage of the glass. Moreover the friction of the water to slow movement is negligible and a greenhouse of substantial weight can be moved with but little effort.

The invention may be carried into practice in various ways but some specific embodiments are indicated by way of example in the accompanying drawings, in which Figure 1 is a more or less diagrammatic front elevation of a greenhouse embodying the invention with the troughs shown in section, Figure 2 is a similar view of the structure lowered on to the troughs with the floats removed, Figure 3 is a plan of the structure on a reduced scale, and Figures 4-7 are diagrams respectively of modified arrangements.

As shown in Figure 1 the greenhouse comprises a roof A and a pair of side walls B. The roof is supported by means of trusses C some of which are reinforced with braced girders $C^1$. These in turn are carried by lateral supports D built up in the form of a framework giving the necessary strength. The lower ends of the supports D are secured to a number of feet E, or continuous longitudinal members, upon which the whole structure is adapted to rest. The roof A the sides B and the end trusses C are all provided with glazed panels.

In the ground are a pair of parallel horizontal troughs F made of concrete suitably reinforced, for example by angle girders G at their upper edges. The greenhouse is placed so as to rest with its feet on the angle girders G, and the troughs are filled with water.

When it is desired to move the greenhouse longitudinally two or more floats H are placed in the troughs and allowed to fill with water until they sink to a depth at which they can be floated into position beneath the feet E of the greenhouse. The floats may be simply built up of wood such as stout matchboard covered with water-proof felting or similar material since they are normally removed from the troughs after use.

As shown in Figure 1 they may be open at the top. When the floats are in position the water is pumped out of them so as to increase their buoyancy. For this purpose a pipe communicating with a portable force pump can be temporarily introduced into the float. As the water is removed from the floats their buoyancy increases until they support the weight of the greenhouse which is thereby lifted off the angle girders G. The greenhouse can then be pushed along without difficulty to its new position, after which the water is allowed to enter the floats, for example by means of valves or plugs, and the greenhouse sinks gently on to the girder G again as shown in Figure 2. The floats are then removed.

For a greenhouse of moderate size the required cross-sectional area of each float may for example be of the order of a square foot. Thus a pair of floats of this cross-section 18 ft. long for example would support about a ton.

The ends of the greenhouse are open in order to permit the greenhouse to pass over growing plants but are provided with a number of removable panels K attached to the roof in any convenient manner, for example by hooks L passing over a rod M. If necessary the lower edges of these panels may be steadied in position by means of a removable cross bar. Alternatively the panels K instead of being removable may be hinged so as to be movable by swinging into positions in which they clear the plants.

When the greenhouse has been lowered into the position which it is to occupy, suitable detachable reinforcing members may be secured in position. For example, as shown in Figure 2, at the front and at the back rods or wires N may be provided each extending across from a fixed anchorage P secured to the trough on one side to the junction of the roof with the opposite side and tightened by turn-buckles Q in order to cross-brace and assist in anchoring the structure. Other means may be provided for anchoring the feet of the greenhouse in position if desired. For example, the feet E may be provided with dowel pins entering cooperating recesses in the girder member G, or vice versa, as the greenhouse is lowered into position.

As will be seen from Figures 1 and 2 the lower edges of the sides B are approximately in alignment with the upper edges of the outside walls of the troughs F. In other words the troughs lie within the greenhouse and can be used to furnish a supply of water required therein thus obviating the need for separate tanks for this purpose. Those parts of the lengths of the troughs which are not covered by the greenhouse may for example be covered over with duckboards R as indicated in Figure 3 and thereby serve to give access to all parts of the strip of ground and if desired serve as a runway for a wheelbarrow or the like. The edges of the roof A are formed with gutters $A^1$ which collect the rain water from the roof and deliver it through pipes into the troughs.

It will be appreciated that the method of introducing floats and shifting the greenhouse may be varied. Thus for example each float may be made closed and airtight and provided with a nozzle or pipe for connection to a source of compressed air whereby the water can be forced out past a suitably arranged valve. Or again where an ample supply of water is available, as when the ground is near a stream, it may be unnecessary to allow the floats to fill with water at all. Thus by partially emptying the troughs the floats can be lowered sufficiently to allow them to be introduced under the feet of the greenhouse and on filling the troughs the greenhouse will be raised.

Moreover the invention is not limited to the particular construction of greenhouse shown in Figures 1 and 3 and various modifications are indicated diagrammatically in Figures 4–7.

Thus in Figure 4 the troughs are closer together than the lower edges of the sides B so that the supports D are spaced inwards considerably from the sides B. In this case in order not to waste the ground area occupied by the troughs in the space under glass, strips of flooring or shelves S are secured to the supports D and may be used either for walking on or as indicated to accommodate plants in pots.

The arrangement shown in Figure 5 is similar to that shown in Figures 1 and 2 except that it is intended for use with low plants and a longitudinal supporting member $E^1$ taking the place of the separate feet E is attached directly to each side of the roof A.

The arrangement indicated in Figure 6 is in the nature of an ordinary garden frame and in this case a floating roof or cover T is employed and the troughs are formed in the tops of a pair of low walls U.

The arrangement in Figure 7 is intended for treatment under glass of plants and trees growing against a wall. In this case a single trough is employed and is formed at the top of the wall W. The roof or cover Y is of inverted V form and is supported along its apex.

In all the arrangements described the details of construction may vary in accordance with requirements, for example doors and ventilating windows may be provided where required and in some cases all the panels may be glazed while in other cases this may not be necessary. Moreover where the troughs are maintained full of water it may be desirable to provide some means for preventing cracking due to frost, for example the troughs may be lined with wood or some resilient material such as rubber or may be formed with sloping sides. Any desired number of troughs may be provided in accordance with the size of the structure to be supported.

What I claim as my invention and desire to secure by Letters Patent is:—

1. A greenhouse structure comprising in combination a cover for plants, at least one float immersible in liquid, and means for supporting the cover on the float.

2. A greenhouse structure comprising in combination at least one fixed horizontal trough, a cover for plants extending over ground adjacent the trough, at least one float disposed in the trough and adapted to float on liquid contained therein, and means for supporting the cover on the float.

3. A greenhouse structure comprising in combination a plurality of fixed horizontal parallel troughs spaced apart in a horizontal direction, a cover for plants spanning the ground between the troughs, a plurality of floats disposed in the troughs and adapted to float on liquid contained therein, and means for supporting the cover on the floats.

4. A greenhouse structure comprising in combination a plurality of fixed horizontal parallel troughs spaced apart in a horizontal direction, a cover for plants spanning the ground between the troughs, a plurality of floats disposed in the troughs and adapted to float on liquid contained therein, and means for alternatively supporting the cover on the floats or on fixed surfaces beside the troughs.

5. A greenhouse structure comprising in combination two parallel horizontal troughs spaced apart in the ground, a cover for plants having in plan two parallel sides which lie adjacent to the troughs the ground between which is spanned by the cover, a plurality of floats disposed in the troughs and adapted to float on liquid contained therein, and means for supporting the cover on the floats.

6. A greenhouse structure comprising in combination a cover for plants open at the bottom and having a roof and side walls, a plurality of floats immersible in liquid, and means for supporting the cover on the floats.

7. A greenhouse structure comprising in combination a cover for plants open at the bottom and having a roof and side walls and means for closing at least one end, a plurality of floats immersible in liquid, and means for supporting the cover on the floats.

8. A greenhouse structure comprising in combination a plurality of fixed horizontal parallel troughs spaced apart in a horizontal direction, a cover for plants spanning the ground between the troughs and extending laterally beyond them, a plurality of floats disposed in the troughs and adapted to float on liquid contained therein, and means for alternatively supporting the cover on the floats or on fixed surfaces beside the troughs.

9. A greenhouse structure comprising in combination a plurality of fixed horizontal parallel troughs spaced apart in a horizontal direction, a cover for plants spanning the ground between the troughs, a plurality of floats disposed in the troughs and adapted to float on liquid contained therein, means for alternatively supporting the cover on the floats or on fixed surfaces beside the troughs, and means for leading rain water from the cover down into the troughs.

10. A greenhouse structure comprising in combination a plurality of fixed horizontal parallel troughs spaced apart in a horizontal direction, a cover for plants spanning the ground between the troughs, a plurality of floats disposed in the troughs and adapted to float on liquid contained therein, means for alternatively supporting the cover on the floats or on fixed surfaces beside the troughs, and means for altering the buoyancy of each float to cause them alternatively to support to cover or to deposit it on the said fixed surfaces.

11. A greenhouse structure comprising in combination a plurality of fixed horizontal parallel troughs spaced apart in a horizontal direction, a cover for plants of which at least parts of the ends are open and which spans the ground between the troughs, movable panels adapted to close in the said open parts of the cover at will, a plurality of floats disposed in the troughs and adapted to float on liquid contained therein, and means for alternatively supporting the cover on the floats or on fixed surfaces beside the troughs.

HARRY RALPH RICARDO.